Jan. 9, 1962     W. E. SCHMIDT     3,016,078
TRACTION DEVICE FOR VEHICLE WHEELS

Filed May 31, 1960     5 Sheets—Sheet 1

INVENTOR.
William E. Schmidt
BY
Hovey, Schmidt, Johnson & Hovey
ATTORNEYS.

Jan. 9, 1962  W. E. SCHMIDT  3,016,078
TRACTION DEVICE FOR VEHICLE WHEELS
Filed May 31, 1960  5 Sheets—Sheet 2

INVENTOR.
William E. Schmidt
BY
Hovey, Schmidt, Johnson & Hovey
ATTORNEYS.

Jan. 9, 1962 W. E. SCHMIDT 3,016,078
TRACTION DEVICE FOR VEHICLE WHEELS
Filed May 31, 1960 5 Sheets-Sheet 3

INVENTOR.
William E. Schmidt
BY
ATTORNEYS.

Jan. 9, 1962 W. E. SCHMIDT 3,016,078
TRACTION DEVICE FOR VEHICLE WHEELS
Filed May 31, 1960 5 Sheets-Sheet 4
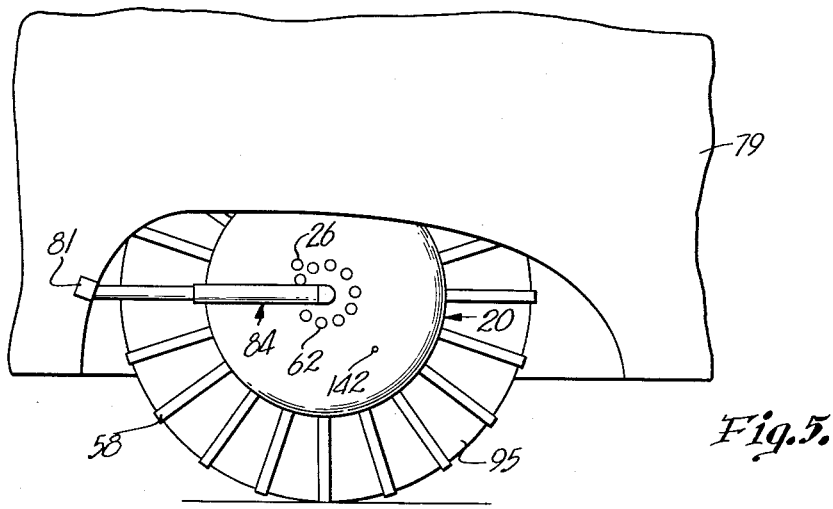
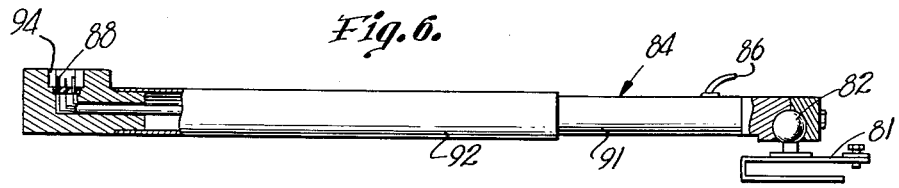
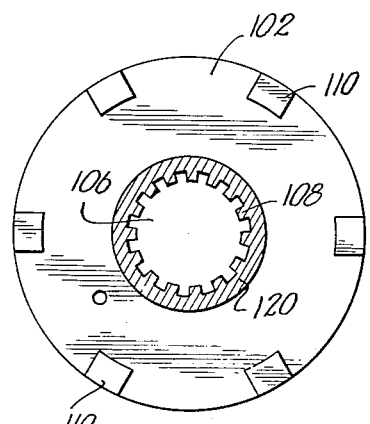
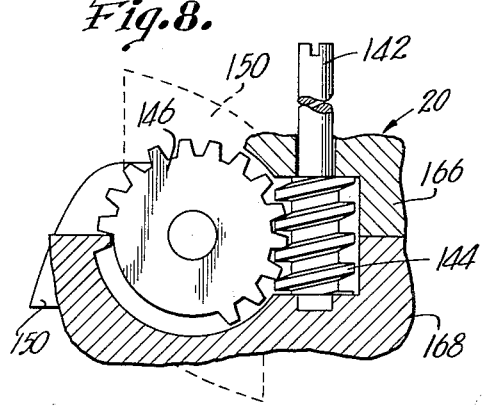
INVENTOR.
William E. Schmidt
BY
Hovey, Schmidt, Johnson & Hovey
ATTORNEYS.

Jan. 9, 1962 W. E. SCHMIDT 3,016,078
TRACTION DEVICE FOR VEHICLE WHEELS
Filed May 31, 1960 5 Sheets-Sheet 5

INVENTOR.
William E. Schmidt
BY
Hovey, Schmidt, Johnson & Hovey
ATTORNEYS.

United States Patent Office 3,016,078
Patented Jan. 9, 1962

3,016,078
TRACTION DEVICE FOR VEHICLE WHEELS
William E. Schmidt, Shawnee, Kans. (1568 "A" White Drive, Chanute Air Force Base, Rantoul, Ill.)
Filed May 31, 1960, Ser. No. 32,828
16 Claims. (Cl. 152—216)

The present invention relates to a traction device for vehicle wheels and more particularly, to a traction device which may be removably fixed to vehicle wheels during seasons of inclement weather wherein means are provided for affording additional traction for vehicle wheels which may be manually or automatically applied to the wheels and removed from the wheels.

The present invention proposes to provide a traction device for vehicle wheels such as the wheels of an automobile wherein a housing is provided which can be removably attached to the rim of such a wheel after the hubcap has been removed, and wherein the housing contains a plurality of traction producing means which may be manually or automatically extended from the housing about the traction surface of the tire when needed and easily retracted in the same manner when no longer required.

It is therefore an object of the present invention to provide a traction device for automobile wheels or the like including a housing which may be removably connected to the wheel rim after the hubcap has been removed, and means normally contained within the housing for producing traction, and further means for extending and retracting the traction producing means either manually or automatically between the normal position within the housing and an extended position wherein the traction producing means encompass the surface engaging portion of the tire and provide additional traction to the tire when it rides upon a road surface or the like.

It is a still further object of the present invention to provide a device of the character described wherein means are provided for removably engaging said housing with the rim of a wheel such that the housing will rotate with the vehicle wheel. It is a still further object of the present invention to provide a device of the character described wherein means are provided for disengaging the automatic means for driving out the traction producing means when it is desired to use manual mechanism for driving out the traction producing means.

It is another object of the present invention to provide in a device of the character described, traction producing means consisting of a plurality of elongated spring metal straps having a generally J-shaped configuration when in the extended position for use in providing additional traction to the wheel. It is another object of the present invention to provide automatic means for driving the straps of the invention as above described including a fixed drive element in the housing which does not rotate with the wheel, and a movable drive element which engages with the fixed drive element so that the motion of the wheel in either the forward or reverse direction can effectively be used to drive the straps between the positions.

It is still another object of the present invention to provide in a device of the character described above an electrical circuit drivable off of a power source such as the automobile generator or battery, and including a coil for electromagnetically engaging the fixed and rotatable drive elements.

It is a still further object of the present invention to provide in a device of the character described, a pair of fixed and rotatable drive elements and a pair of electromagnetic coils whereby the coils may be selectively energized to engage selective fixed and rotatable drive elements so that the straps may be selectively driven in an outgoing or incoming direction.

It is a still further object of the present invention to provide in a device of the character described above, a switch responsive to the direction of rotation of the wheels which may alternately select between each of said electromagnetic coils so that regardless of change of direction of rotation of the automobile, the straps may continue to be driven in the desired direction.

It is still another object of the present invention to provide in the electrical circuit described above, a selector switch for determining whether the straps are to be driven out of or into said housing.

It is still another object of the present invention to provide means for fixing said rotatable drive elements when it is desired to use the traction device and for releasing said rotatable drive elements to rotate with said housing when there is no necessity for using the traction means.

Further objects and advantages inherent in the present invention will appear as this description proceeds, and various modifications or changes may be made to the structure about to be described without departing from the spirit of the present invention. All such further objects and changes and modifications are intended to be covered in the scope of the appended claims.

In the drawings:

FIG. 5 is a side elevational view of a portion of an automobile showing a wheel thereof to which the present invention has been applied;

FIG. 6 is a top plan view of the device for interconnecting the auto body and the traction device, with portions shown in section to show details of construction;

FIG. 7 is a side elevational view of a drive element of the present invention;

FIG. 8 is an enlarged, cross-sectional view of the means for disengaging the automatic drive when it is desired to use the manual drive;

Figure 1:
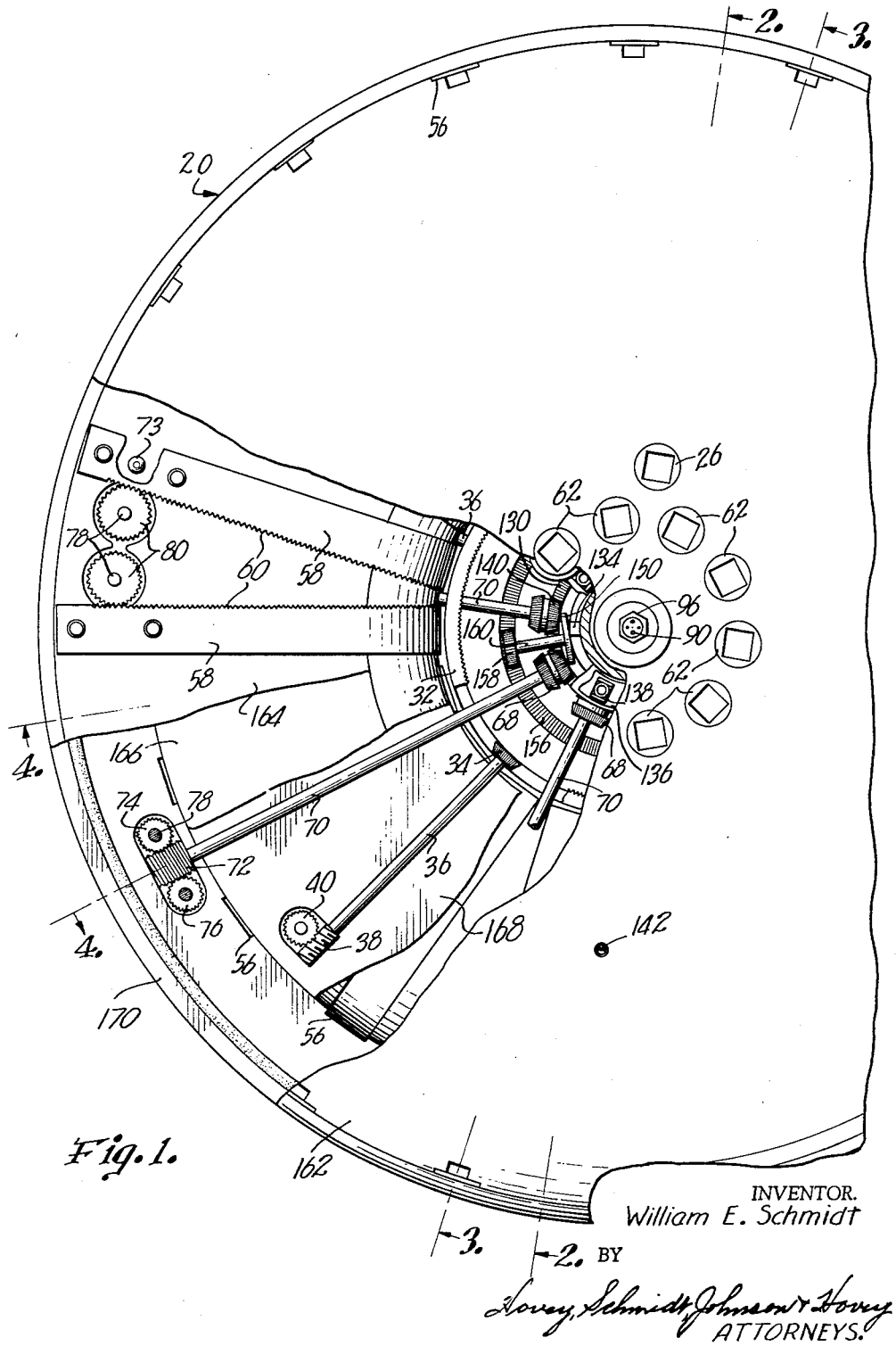
FIGURE 1 is a side elevational view of a portion of structure embodying the present invention, partly broken away to show details of construction.

Referring now to the drawings and more particularly to FIGS. 1 through 4 of the drawings of the present invention, there is shown a housing generally identified by the numeral 20 affixed to the rim 22 of a vehicle wheel and completely covering the hub 24 thereof.

A plurality of means are provided for removably engaging housing 20 with rim 22, only one of which is illustrated in the drawings in FIG. 2 and will be described. It is to be understood that the remaining of such plurality of elements are identical with the one described, and that all are used at the time of engagement so that the housing 20 may be properly engaged with the rim 22. Each of said rim engaging means includes a socket 26 in the housing for receiving a manually manipulable tool (not shown) such as a speed wrench of the common variety and having a shank of the proper dimensions to fit socket 26. Socket 26 is biased by a spring 28 to normally be in the position shown in FIG. 2, but upon the insertion of a tool the spring is depressed and the socket 26 travels inwardly so that the socket may engage and drive gear 30 in response to the manual rotation of the speed wrench. Gear 30 engages with a gear segment 32 to drive a bevel gear 34 mounted on a shaft 36 journalled for rotational movement in housing 20. Rotation of shaft 36 will drive a worm gear 38 such as shown in FIG. 1, which in turn drives a pinion 40 mounted on an additional shaft 42 also journalled in housing 20 for rotational movement. On the opposite end of shaft 42 from pinion 40 is a bevel gear 44 in driving engagement with a bevel gear 46 threaded onto a clamping member 48. Clamping member 48 is provided with screw threads as shown in FIG. 2, such that rotational movement of bevel gear 46 will drive the clamping member 48 outwardly relative to housing 20 into engagement with rim 22 upon rotation of the speed wrench in one direction, or inwardly into said housing 20 upon reverse rotation of said speed wrench.

Figure 2:
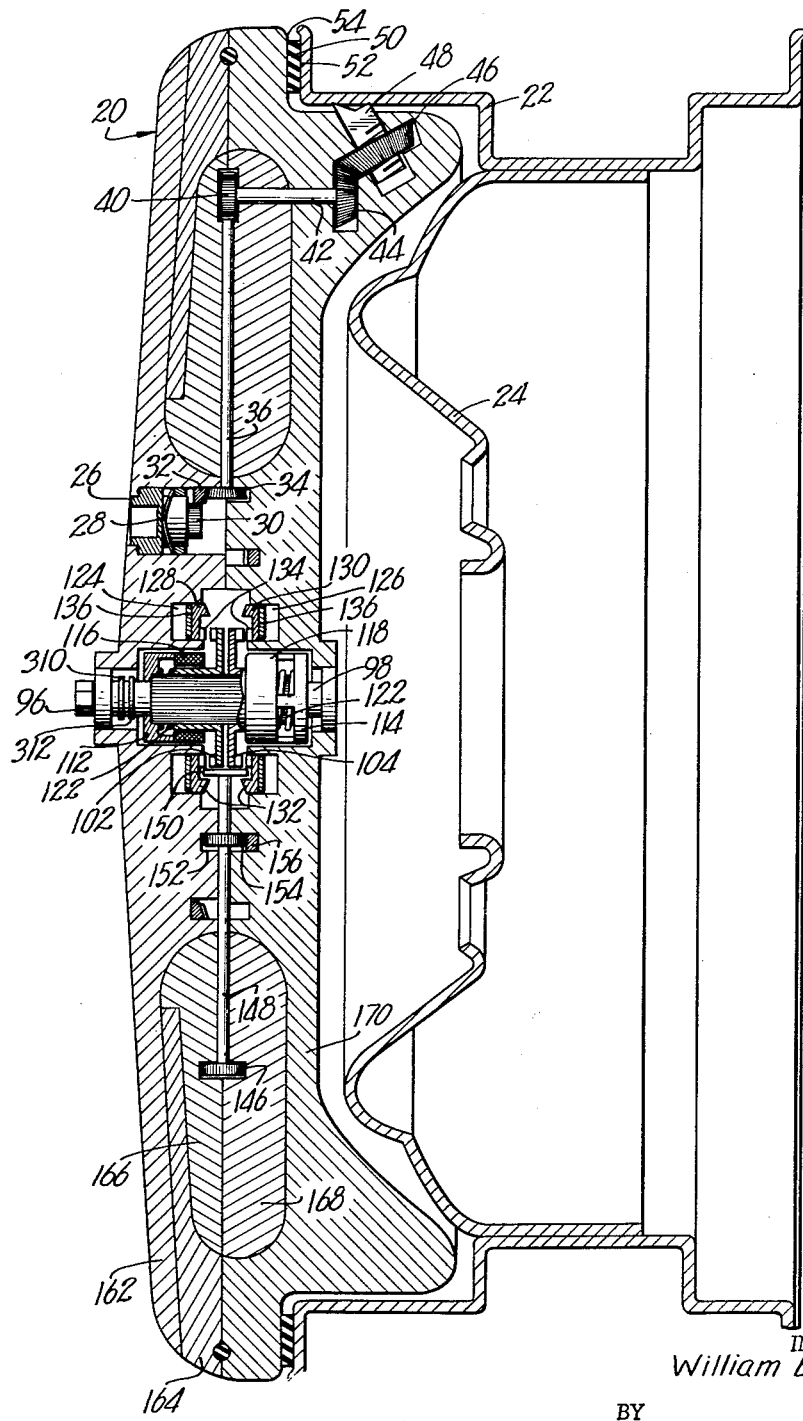
FIG. 2 is a cross-sectional view through the structure of FIG. 1, taken along line 2—2 of FIG. 1 looking in the direction of the arrows.

It should be noted that gear segment 32 as shown in FIG. 2 is in reality a rack, as can be seen by referring to FIG. 1, which is annular and with which all of the remaining bevel gears 34 are in engagement in a master-slave relationship such that rotation of the speed wrench in socket 26 will drive rack 32 to rotate all of the bevel gears 34 and their respective shafts 36, whereby all of the clamping members 48 are driven inwardly or outwardly the same distance such that the housing 20 is automatically properly centered on the rim 22 with an equal amount of engaging pressure being brought to bear through each clamping member 48.

It should be further noted that a generally annular sealing member or stop 50 is provided between the outwardly flaring flange 52 of rim 22 and the rim facing surface 54 of housing 20, preventing mud or water or foreign objects from entering into the area between the housing 20 and the rim 22 and hub 24 and further, eliminating any rattling or other undesirable effects which might be produced as a result of metal-to-metal contact between the rim 22 and housing 20. It should of course be understood that the sealing member or stop 50 may be made from any suitable material such as rubber or the like.

A plurality of compartments 56 are provided in housing 20 for containing the traction producing means of the present invention. Inasmuch as all of the traction producing means are identical, only one of them will be described in detail, it being remembered that all of the traction producing means are alike. In compartment 56 there is contained a traction producing strap 58 made from spring metal or the like and provided with a rack 60 on one edge thereof for a reason which will become apparent as this description proceeds. Means are provided for driving the straps between the position within housing 20 shown in FIG. 3 and the position extended from the housing around the periphery of the tire as shown in FIG. 5. The means include a socket 62 in said housing for receiving a manually manipulable tool (not shown) such as a speed wrench or the like, said socket 62 having a shaft segment 64 extending inwardly into housing 20 and provided with a beveled gear surface 66 on the innermost end thereof remote from socket 62. Bevel gear surface 66 is in meshing engagement with a bevel gear 68 at one end of a strap drive shaft 70 rotatably journalled within housing 20. At the end of shaft 70 remote from bevel gear 68, there is provided a worm gear 72 in driving engagement with a pair of pinions 74 and 76. Each pinion 74 and 76 is mounted adjacent one end of a shaft 78 journalled for rotational movement in housing 20, and having a rack engaging gear 80 adjacent the other end thereof in driving engagement with the rack 60 of strap 58. It is obvious therefore, that each socket 62 and its related structure as described above will drive a pair of pinions 74 and 76 which will in turn, through their respective shafts 78, drive a pair of gears 80 to drive two straps 58 between the positions already mentioned. For this purpose, each set of two straps 58 is provided with the rack portions 60 facing each other such that each pair of gears 80 rotates in opposite directions but drives the straps 58 in the same direction.

It can now be seen that by providing one socket 62 for each set of two straps, all of the straps may be manually driven out or in, depending upon the direction of rotation of the manually manipulable speed wrench or the like, and that no more than two sets of straps will be bound by the engagement of the tire with the road surface. It is of course a simple matter to move the car forward or backward a few inches to a foot to permit the remaining one or two sets of straps to be hand driven to their desired positions when the manual strap driving device is operated. In addition a pin 73 biased by a spring 75 both in recess 77 is provided for engaging an aperture (not shown) in each strap 58 when the latter is fully extended to prevent the straps 58 from being inadvertently cranked out of housing 20.

Further means are provided for automatically driving the straps 58 between their respective positions without the driver being required to leave the driver's seat of the vehicle. It should be noted, however, before going into the automatic driving means, that either the mechanical or automatic driving means may be provided in the present invention to the exclusion of the other, or that both may be provided together, and it is clearly not desired to limit the present invention to the combination of the two driving mechanisms as disclosed in the particular embodiment chosen for illustration for convenience sake.

When it is desired to use the automatic driving means, a source of power and a means of connecting the source of power with the housing must be provided and, in the particular embodiment illustrated, the electrical power of the generator and battery is used, but it should be remembered that the hydraulic system or other means could be used for accomplishing the same purposes without departing from the spirit of the present invention. In such a device, a switch is provided whereby the driver can activate electrical circuitry to drive the straps to either position from the other as he desires, from electrical circuitry which will more completely be described as this specification proceeds. In any event, current is tapped off of the automobile system and as shown in FIG. 5, the wiring is led to the fender of the automobile immediately adjacent to the tire and quite probably terminating in a female coupling, although any means of coupling could be provided. An extension bar is connected to automobile fender 79 such as by the clamping means 81 shown in FIG. 6 of the drawings and provided with a universal ball joint 82 permitting the tire to have free motion in the vertical direction as required. The wires feed into an extension bar 84 having the female portion of the universal joint 82 connected thereto, as shown in FIG. 6, as illustrated by a wire harness 86. The wires extend therethrough terminating in a male outlet 88 which can be easily plugged into female fitting 90 as shown in FIG. 1 to make the electrical connection between the wiring system of the automobile and the driving mechanism within housing 20. Extension bar 84 is provided with a pair of telescoping members 91 and 92 which permit relative movement between the members 91 and 92 by virtue of their telescoping engagement. Such telescoping movement permits the tire 95, as shown in FIG. 5, to move horizontally forwardly or rearwardly from its normal position without affecting the extension bar 84. Telescoping member 92 is provided with a socket 94 which engages with a hexagonal housing nut 96 for a purpose which will become apparent as this description proceeds.

It should be noted at this point that the extension bar of the type described is particularly useful, for the reason that if it is connected to a drive wheel, even though the car may not be moved, the driving rotation of the drive wheels of the automobile may be made use of to drive the straps off and on. For this reason, it is preferable that the device of the present invention be applied to the drive wheels of an automobile or other vehicle, although it is not necessary and can be used on the wheels if motion of the car can be obtained. It is also well to remember that the extension bar may be used on front wheel drive automobiles and the like by virtue of placing the bar in a vertical connection between the fender and the tire such that the telescoping members compensate for the up and down vertical motion of the tire, and that the universal joint 82 will permit the steering motion of the turning of the front wheels.

The electrically operable drive means include a drive shaft 98 journalled in housing 20 centrally thereof, the same projecting from housing 20 on the outboard side and terminating in hexagonal housing nut 96. Shaft 98 normally rotates with the housing 20 but is journalled to permit the housing 20 to rotate relative thereto when extension bar 84 is connected with housing nut 96 to fix the shaft 98. Shaft 98 has a central splined shoulder 100 on which is mounted a pair of fixed, centrally disposed drive elements 102 and 104. Each of the drive elements 102 and 104 are discs provided with a central opening 106 and a splined central opening margin 108 complemental to the splines of splined shoulder 100, for insuring a snug driving fit between the shoulder 100 and the margin 108. Each of the elements 102 and 104 have a smooth, flat surface on one side and a flat surface on the opposite side broken by a plurality of dogs 110 extending at right angles from the surface at spaced intervals around the periphery of the elements 102 and 104. A pair of drive elements 102 and 104 are emplaced on the splined shoulder 100 approximately centrally of housing 20 and of the shaft 98, with the smooth faces of the elements 102 and 104 being in back-to-back relationship and the dogs 110 projecting from the oppositely facing surfaces thereof. It should be further noted that while the splined engagement between the elements 102 and 104 and shoulder 100 prevent the elements 102 and 104 from rotating relative to shaft 98, the elements 102 and 104 are freely slidable axially for a reason which will become apparent as this description proceeds.

A pair of retaining cups 112 and 114 are mounted fixedly on shaft 98 exteriorly of elements 102 and 104, with their open ends facing toward the elements 102 and 104 and their shaft engaging ends abutting and partially encircling splined shoulder 100 so as to be fixed when the shaft 98 is fixed. Mounted on each of the retaining cups 112 and 114 are a pair of electromagnetic coils 116 and 118 respectively. Each of the drive elements 102 and 104 has a shoulder 120 extending axially along the splined shoulder 100. Each shoulder 120 extends in the same direction as the dogs of the drive element with which it is integral and there is emplaced between the margin of shoulder 120 axially remote from elements 102 and 104 and the respective cup 112 or 114, a coil spring 122 continuously biasing drive elements 102 and 104 toward back-to-back relationship.

Figures 3, 4:
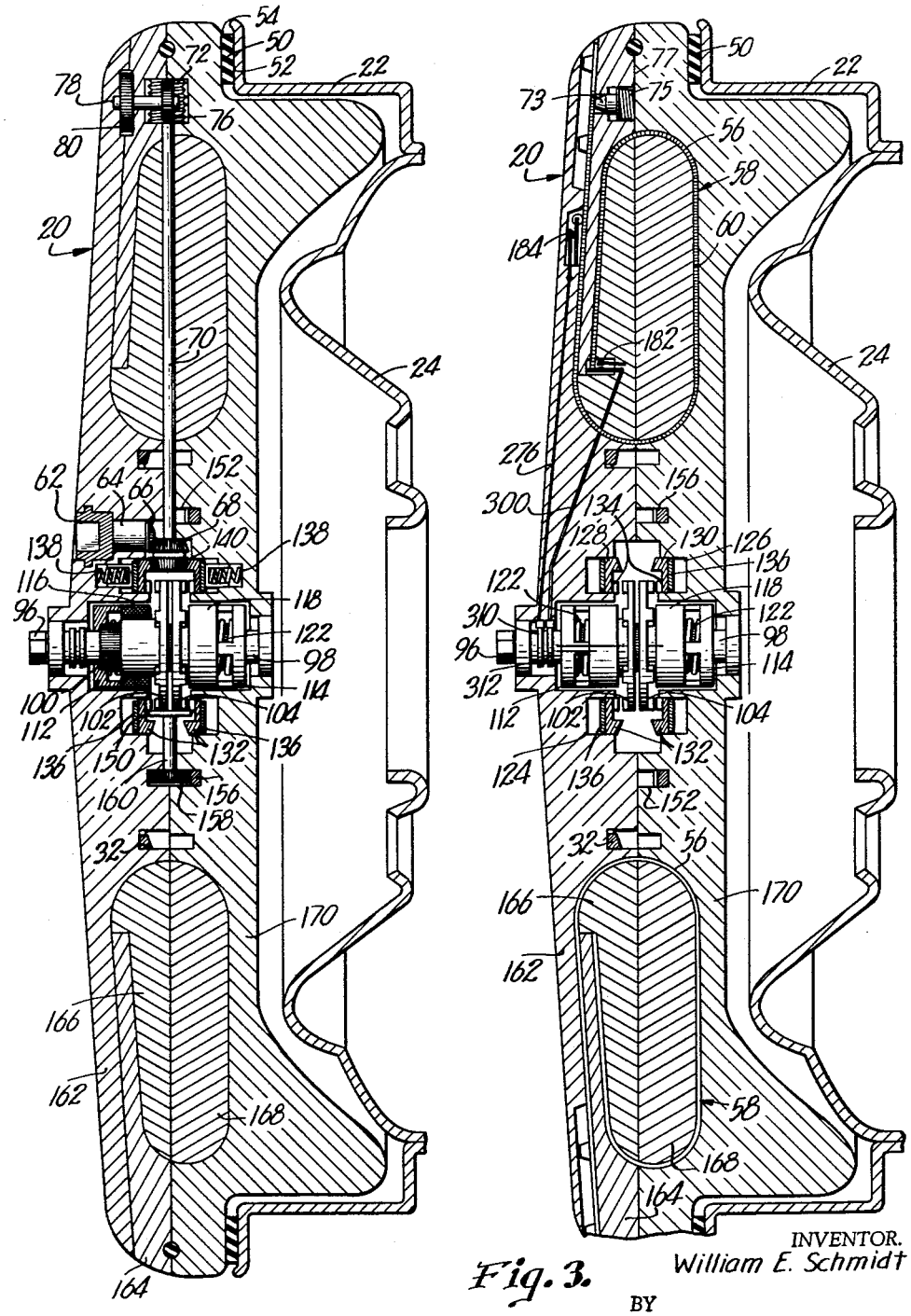
FIG. 3 is a cross-sectional view taken through the structure of FIG. 1 along line 3—3 looking in the direction of the arrows.
FIG. 4 is a cross-sectional view through the structure shown in FIG. 1, taken along line 4—4 looking in the direction of the arrows.

A pair of annular grooves 124 and 126 are provided in housing 20 circumscribing the centrally disposed axle 98 and the structure mounted thereon in which are disposed a pair of annular, rotatable drive elements 128 and 130 respectively. Rotatable drive elements 128 and 130 are in the form of annular discs having a flat, outwardly facing surface and an inwardly facing surface provided with a perpendicularly extending flange 132 having a bevel gear surface. Each of the rotatable drive elements 128 and 130 has a central opening therethrough and a plurality of dogs 134 are spaced around the margins of the central opening extending perpendicularly from the same face of rotatable drive elements 128 and 130 from which flange 132 extends. Rotatable drive elements 128 and 130 and annular grooves 124 and 126 are so formed that the rotatable drive elements 128 and 130 are axially spaced with respect to the fixed drive elements 102 and 104 on opposing sides thereof. Each rotatable drive element 128 and 130 is provided with a smooth backing plate 136 providing a surface on which the smooth side of the rotatable drive elements 128 and 130 may slide when the drive mechanism is working. Each of the backing plates 136 is biased as shown in FIG. 4 by a spring 138 such that rotatable drive elements 128 and 130 are continuously biased toward each other, and the gear surfaces of flanges 132 are engaged with a bevel gear 140 of a shaft 70 which extends radially outward from the central area and provides a portion of a force transfer mechanism for transferring driving force of the driving mechanism to the straps, the driving being the same from this point on as previously described with respect to the manual means for driving out the straps. It should be understood however, that each radially extending shaft 70 is provided with a gear 140 such that operation of the drive mechanism will drive all of the straps at once. It is now obvious that energization of one of the coils 116 or 118 will electromagnetically attract the respective fixed drive element 102 or 104, causing the drive element 102 or 104 to slide axially on the splined surface. The dogs 110 of elements 102 and 104 are spaced radially from the shaft the same distance as the dogs 134 of rotatable drive elements 128 and 130, such that axial sliding of a fixed element 102 or 104 attracted by one of the coils 116 or 118 will cause the plate which is moved, to engage with its respective rotatable drive element 128 or 130, fixing the same against rotational movement when the dogs 110 and 134 engage. Rotation of the wheel as a result of normal driving action of the automobile or other vehicle to which the invention is applied will cause the respective gears 140 to rotate along the bevel gear surface of flange 132 to rotate shaft 70 to drive the straps. It will be further recognized that the direction that shaft 70 is driven is dependent upon which of the fixed plates 102 or 104 is engaged with its respective rotatable drive element 128 or 130. It should be further noted that if the direction that the vehicle is driven is altered prior to the time that the straps are driven all the way from one position to the other by simply reversing the coil energization, the straps may be continued to be driven in the same direction in spite of the reversal of direction of the vehicle. It should also be understood that the rotatable drive element 128 or 130 which is not connected will slide in its respective annular groove in response to the rotation of gear 140, due to the fact that the springs 138 are holding the element in engagement with the gear 140, but such action has no undesirable result.

While it is entirely possible to produce a device of the present invention with either the manual means for driving the straps or with the automatic means for driving the straps, it may on occasion be desirable to have the mechanical means for driving the straps present where the automatic means are provided, in the event of electrical failure in the electrical system of the vehicle or other emergency which might prevent the automatic means from being operable. For this reason, means are provided as shown in the drawing for disengaging the automatic driving means from the plurality of gears 140 so that each of the sets of straps may be run out by hand when the automatic driving means is not being operated. Such disengaging mechanism consists of a shaft 142 as particularly shown in FIG. 8 of the drawings, having a slot in one end adapting shaft 142 to be rotated by a hand tool such as a screwdriver. The end of shaft 142 having the slot therein is exposed through housing 20 as indicated in FIG. 1 so that it is readily usable. Adjacent the opposite end of shaft 142 which is journalled for rotational movement in housing 20, there is a worm gear 144 in driving engagement with a cam gear 146. It will be noted that the periphery of cam gear 146 has teeth thereon subtended by an angle of approximately 270° and has a smooth peripheral portion subtended by an angle of approximately 90°. Gear 146 is mounted at one end of a radially extending shaft 148 and a cam 150 is mounted at the other end of shaft 148 for rotation therewith.

It will be noted that shaft 148 is journalled in housing 20 in such a position that the innermost end of the radially extending shaft 148 where the cam 150 is mounted, places the cam 150 between the rotatable drive elements 128 and 130, as particularly well shown in FIG. 2. The cam 150 has the general shape indicated in FIG. 8 of the drawings and is movable between the solid and dotted line positions shown in FIG. 8. The solid line position of FIG. 8 corresponds with the position that the cam is in in FIG. 2 of the drawings, while the dotted line position of FIG. 8 is not shown in any of the drawings in relationship to the rotatable drive elements 128 and 130. However, it should be obvious that when the cam is in the dotted line position shown in FIG. 8, the rotatable drive elements 128 and 130 will be forced apart against the biasing action of the springs 138, preventing them from engaging with the plurality of gears 140 and thereby disengaging the electrical or automatic drive mechanism previously described.

It will be noted by referring to FIG. 2 that a groove 152 is provided in housing 20 for receiving a gear 154 and a rack 156. Gear 154 will of course rotate with shaft 148 in response to the turning of the mechanism already described driving rack 156 within groove 152. A plurality of slave gears 158, mounted on shafts 160 having cams 150 at the opposite ends thereof identical to the one already described, whereby rotation of the rack 156 will drive each of the slave gears 158, its shaft 160 and cam 150 such that the drive elements 128 and 130 are cammed uniformly out of engagement with the gears 140 so that there is no contact at any time between the gears 140 and the plates 128 or 130.

It is apparent that mechanical structure has been described which fulfills all of the objects and advantages set forth for the present invention, and the operation thereof has been clearly described. It should be noted that the housing 20 may comprise a plurality of pieces for ease in manufacturing, particularly in machining the grooves or forming the various portions of the housing. As viewed in FIG. 2, the housing comprises five component parts, 162, 164, 166, 168 and 170, which can be assembled in any suitable manner and provided with seals as desired, and it is desirable not to limit the present invention to being made from any particular number of component sections.

Figure 9:
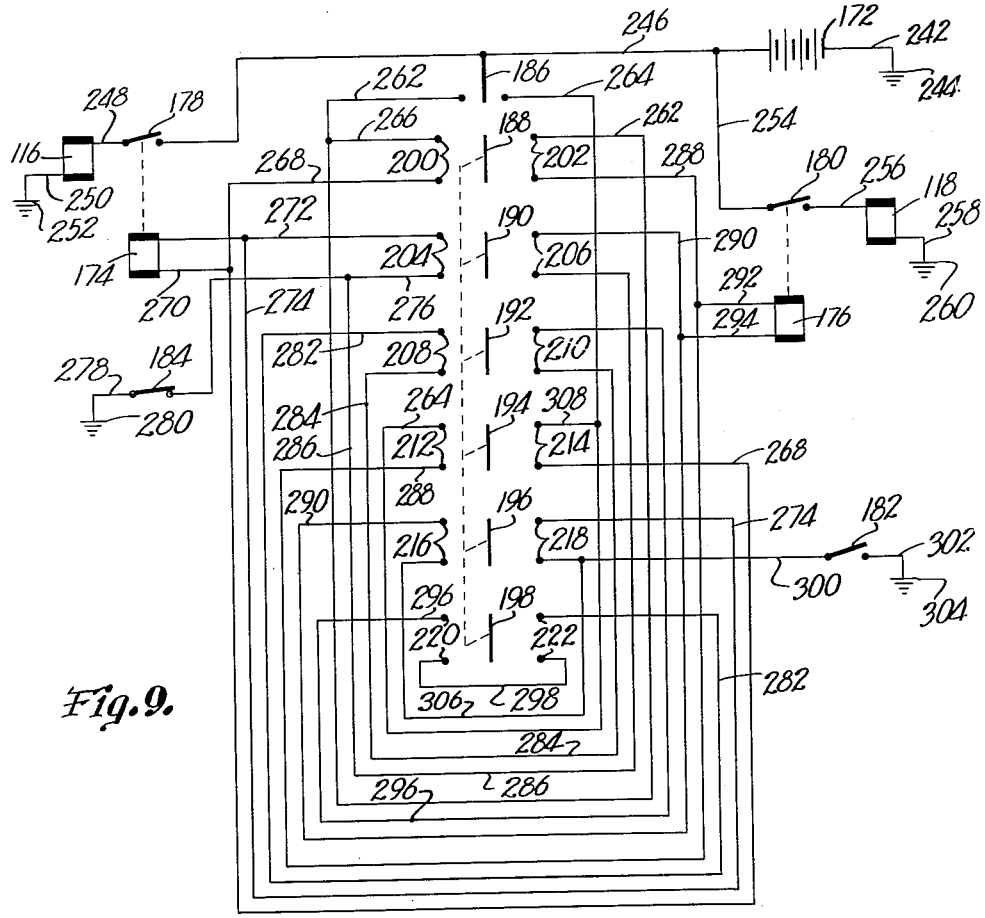
FIG. 9 is a schematic wiring diagram of the electrical circuitry of the present invention.
Figure 11:
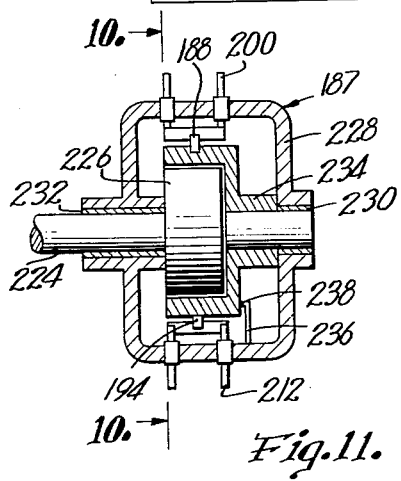
FIG. 11 is a cross-sectional view through a switch of the kind shown in FIG. 10.
Figure 10:
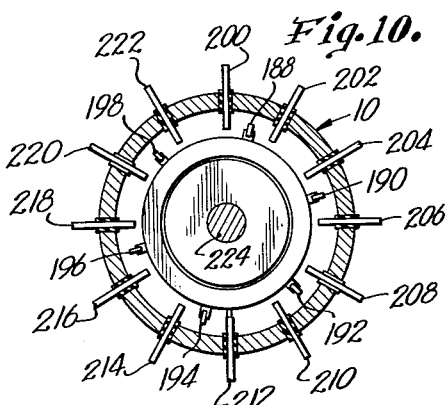
FIG. 10 is a cross-sectional view taken along lines 10—10 of FIG. 11 looking in the direction of the arrows, showing details of the switch responsive to the direction of tire rotation.

Having therefore described all of the mechanical aspects of the invention it remains only to describe the electrical means for operating the invention which are shown in FIGS. 9 through 11 of the drawings in the preferred embodiment. It should be recognized at this point that the major application of a device such as described in the present invention is for the rear wheels of an automobile, truck or other similar vehicle, and while the description has been of only a single device embodying the present invention, it should be recognized that most often a pair of the devices comprising the present invention would be applied one to each rear drive wheel of the vehicle. Each of the devices of the present invention would be identical in construction and therefore, it has been deemed unnecessary to go into detail of the device on the other rear drive wheel of the vehicle. The wiring diagram of FIG. 9 discloses a means of operating one device such as has been described in the foregoing paragraphs, and it is to be understood that the system may be easily duplicated for a second device if so desired and, in fact, the schematic illustration of FIG. 9 has provision for such duplication in the preferred usage such as an automobile, truck or the like.

In FIG. 9 there is shown schematically a battery 172 of the normal automotive type. There is further shown a pair of relays comprising coils 174 and 176 and switches 178 and 180 respectively associated with coils 174 and 176. The wheel coils 116 and 118 which are shown in their structural positions in FIG. 2 of the drawings, are schematically illustrated in FIG. 9 and identified by the same numbers. Also, the normally closed limit switch 184 and normally open switch 182 illustrated in FIG. 3 of the drawings in their structural position are shown schematically in FIG. 9. Additionally there is shown in FIG. 9 a single pole, double throw switch 186 representing a dashboard switch on the vehicle and having a neutral central position, and contact positions to each side of the central position, as shown. For purposes of ease in explanation, the left-hand side of the schematic illustration may be called the forward side, in other words, the side activated during forward driving of the vehicle, and the right-hand side of the illustration may be regarded as the reverse side, or the side activated during operation of the vehicle in reverse gear. There is further illustrated schematically in FIG. 9 a magnetic switch 187 which is structurally shown in FIGS. 10 and 11 of the drawings and attention is therefore now directed to FIGS. 10 and 11. Switch 187 includes a plurality of switch bars 188, 190, 192, 194, 196 and 198. Switch 187 further includes double-poled contacts 200, 202, 204, 206, 208, 210, 212, 214, 216, 218, 220 and 222.

Structurally, switch 187 comprises a shaft 224 journalled in a housing 228, the shaft 224 having a magnet 226 fixed thereon for rotation therewith. Suitable sleeve bearings 230 and 232 are provided in housing 228 for rotatably receiving and supporting shaft 224. A cup-shaped sleeve 234 is mounted on shaft 224 to be freely rotatable relative to the shaft 224, the cup portion of cup sleeve 234 concentrically containing magnet 226, and having the bars 188 through 198 spaced circumferentially about the outer periphery thereof. It is to be understood that housing 228 is generally cylindrical and that contacts 200 through 222 extend radially inwardly through the outer peripheral margin thereof, as shown in FIG. 11, and are positioned to engage the bars 188 through 198 upon movement of the cup sleeve 234, which will subsequently be described. A centering spring 236 is fixed to the inner peripheral surface of housing 228 and extends radially inwardly, terminating in a flange 238 engaged with cup sleeve 234.

Switch 187 as described above may be operatively connected with the drive shaft, automobile drive axle, or the speedometer or other possible locations but for purposes of this description, it will be assumed that the same is connected to the drive shaft. In such an event, shaft 224 may be simply provided with a pulley (not shown) which may be driven by a belt (not shown) operably connecting the pulley to the drive shaft. Suffice it to say that when shaft 224 is rotated in either direction, the magnet 226 will rotate therewith and shift the cup sleeve 234 under magnetic influence to a first position when the car is in forward gear, wherein bars 188, 190, 192, 194, 196 and 198 engage contacts 200, 204, 208, 212, 216 and 220. If the vehicle is placed in reverse, switch 187 and particularly cup sleeve 234 will be moved so that the bars 188 through 198 will respectively engage contacts 202, 206, 210, 214, 218 and 222.

Having therefore described the switch 187, it is again desirable to refer to the schematic illustration of FIG. 9 wherein battery 172 is shown having a first side connected by electrically conductive means 242 to ground 244. The other side of battery 172 is connected by electrically conductive means 246 to switch 186 and to one side of switch 178. The other side of switch 178 is connected by electrically conductive means 248 to coil 116, coil 116 being further connected by electrically conductive means 250 to ground 252. Electrically conductive means 254 is provided for connecting electrically conductive means 246 to one side of switch 180, the other side of switch 180 being connected by electrically conductive means 256 to coil 118. Coil 118 is further connected by electrically conductive means 258 to ground 260.

One throw of switch 186 is connected by electrically conductive means 262 to one tap of contact 202, the other throw of switch 186 being connected by electrically conductive means 264 to one tap of contact 212. Electrically conductive means 266 is provided for connecting electrically conductive means 262 to one tap of contact 200. The other tap of contact 200 is connected by electrically conductive means 268 to one tap of contact 214. Electrically conductive means 270 is provided for connecting electrically conductive means 268 with coil 174, and electrically conductive means 272 is provided for connecting coil 174 to one tap of contact 204. Electrically conductive means 274 is provided for connecting electrically conductive means 272 with one tap of contact 218. The other tap of contact 204 is connected by electrically conductive means 276 to one side of normally closed switch 184, the other side of which is connected by electrically conductive means 278 to ground 280. One tap of contact 208 is connected by electrically conductive means 282 to one tap of contact 222, the other tap of contact 208 being connected by electrically conductive means 284 to one tap of contact 210. Electrically conductive means 286 is provided for connecting electrically conductive means 276 with one tap of contact 206. Electrically conductive means 288 is provided for connecting the other tap of contact 212 with the other tap of contact 202. Electrically conductive means 290 is provided for connecting one tap of contact 216 with the other tap of contact 206. Electrically conductive means 292 is provided for connecting electrically conductive means 288 with coil 176, coil 176 being further connected by electrically conductive means 294 to electrically conductive means 290. Electrically conductive means 296 are provided for connecting one tap of contact 220 with the other tap of contact 210. Electrically conductive means 298 is provided for connecting the other tap of contact 220 with one tap of contact 222. The other tap of contact 218 is connected by electrically conductive means 300 to one side of normally open switch 182, the other side of normally open switch 182 being connected by electrically conductive means 302 to ground 304. Electrically conductive means 306 is provided for connecting electrically conductive means 300 to the other tap of contact 216. Electrically conductive means 308 is provided for connecting the other tap of contact 214 with electrically conductive means 264.

Having now described the electrical system and the mechanical structure of the present invention, the operation may be described as follows. When it is desired to put the straps 58 on the tire 95 as shown in FIG. 5 of the drawings, in forward gear, switch 186 is moved to the left as shown in the schematic diagram, interconnecting electrically conductive means 246 and 262. Nothing will happen at this point until the car is placed in gear and the car driven in a forward direction, in which case the bars 188 through 198 of switch 187 will move to the first position described, bridging the taps of contacts 200, 204, 208, 212, 216 and 220. Current will then flow through electrically conductive means 262 across bar 188 bridging the taps of contact 200 through electrically conductive means 268 and 270 energizing coil 174. Current will flow from coil 174 through electrically conductive means 272, across bar 190 bridging the taps of contact 204 to electrically conductive means 276 and through normally closed switch 184, electrically conductive means 278 and to ground 280. Energization of coil 174 will close normally open switch 178 such that electric current may flow from battery 172 through electrically conductive means 246 across switch 178, through electrically conductive means 248, energizing coil 116 and then flowing through electrically conductive means 250 to ground 252.

If it is impossible either to move the straps 58 all the way to their on position or to even start toward the on position in forward gear, the straps 58 may be continued in the on direction or driven in the on direction by the simple expedient of placing the vehicle in reverse gear. In reverse gear the bars 188 through 198 will bridge the contacts 202, 206, 210, 214, 218 and 222. Current will then flow through electrically conductive means 246, switch 186, electrically conductive means 262, bar 188 bridging the taps of contact 202, electrically conductive means 288 and 292 to coil 176. Current will flow from coil 176 through electrically conductive means 294, 290, across bar 190 bridging the taps of contact 206, through electrically conductive means 286 and 276, across normally closed switch 184 and through electrically conductive means 278 to ground 280. Energization of coil 176 will close normally open switch 180 thereby enabling current to flow from battery 172 through electrically conductive means 246 and 254, across switch 180, through electrically conductive means 256 to coil 118 and from coil 118 through electrically conductive means 258 to ground 260.

It will be noticed that in either case of operation as described, alternate coils 116 and 118 are energized but inasmuch as the wheel rotation in each case will be in the opposite direction, either of drive elements 128 or 130 will rotate shaft 70 in the same direction, driving worm gear 72 and pinions 76 and 74 in their respective same directions. This of course means that gear 80 will be driven in the same direction and the straps 58 in either of the conditions described will be driven outwardly to their traction producing position.

When it is desired to remove the straps from the vehicle, the same may be done by moving switch 186, if the car is going in the reverse direction, to the right as shown in the schematic illustration, thereby coupling battery 172 through electrically conductive means 246, switch 186, electrically conductive means 264, 308, bar 194 bridging the taps of contact 214, through electrically conductive means 268 and 270 to coil 174. Current will then flow from coil 174 through electrically conductive means 272 and 274, across bar 196 bridging the taps of contact 218 and through electrically conductive means 300, switch 182 and electrically conductive means 302 to ground 304. It must be remembered that when the straps 58 are all the way out, normally open switch 182 is closed and normally closed switch 184 is open, coil 174 having been energized with closed switch 178 so that current may flow from battery 172 through electrically conductive means 246, switch 178, electrically conductive means 248, coil 116 energizing the latter, and electrically conductive means 250 to ground 252. Since coil 116 would be the coil energized to drive the straps 58 outwardly into forward drive, it is obvious that the same may be used for driving the straps 58 inwardly during reverse drive.

In the event that it is impossible to take the straps 58 off going in reverse or to continue strap removal while going in the reverse direction, the simple expedient may be followed of placing the car in forward gear. When such takes place, the bars 188 through 198 will bridge the taps of contacts 200, 204, 208, 212, 216 and 220. Current will then flow from battery 172 through electrically conductive means 246, switch 186, electrically conductive means 264, through bar 194 bridging the taps of contact 212, through electrically conductive means 288 and 292 to coil 176. Current will flow from coil 176 through electrically conductive means 294, 290, through bar 196 bridging the taps of contact 216, through electrically conductive means 306, 300, through switch 182 and electrically conductive means 302 to ground 304. Coil 176 having been energized, switch 180 will be closed, enabling current to flow from battery 172 through electrically conductive means 246, 254, switch 180 and electrically conductive means 256 to coil 118, thence flowing through electrically conductive means 258 to ground 260. In the event the latter circuit is used it will be obvious that coil 118 being energized, which has been previously described, for driving the straps 58 on in the reverse position, will now drive the straps 58 off in the forward position, inasmuch as the direction of rotation of the wheel has been reversed.

It is further to be understood that straps 58 can neither drive out of the housing nor be overdriven into the housing, due to the action of limit switches 182 and 184. It is further obvious that the straps 58 may be retained in either position, or in any position desired, by the simple expedient of moving switch 186 to the neutral position previously described.

A pair of slip ring contacts 310 and 312 are further shown in FIGS. 2 and 3 of the drawings for the purpose of bringing electrical current from the wire harness 86 into contact with electrically conductive means 276 and 300 running to the respective limit switches 182 and 184.

Having thus described the invention what is claimed as new and desired to be secured by Letters Patent is:

1. In a traction device for vehicle wheels, a housing engaged with a wheel of a vehicle for rotation therewith; traction producing means contained within said housing; and elongated drive means rotatable about the longitudinal axis thereof and coupled with said traction producing means for driving the latter between a first position within said housing and a second position extended from said housing and curved around the peripheral portion of said wheel whereby said wheel is provided with additional traction when said traction producing means are in said second position.

2. The structure set forth in claim 1, wherein said traction producing means includes a plurality of elongated metal straps having a J-shaped configuration when extended, said straps being provided with a rack along an elongated edge thereof coupled with said drive means and shiftable responsive to the rotation of said elongated drive means.

3. In a traction device for vehicle wheels, a housing; gear-actuated means within said housing and extendable therefrom for engaging the rim of a wheel for connecting the housing to the rim for rotation therewith; traction producing means contained within said housing; and drive means coupled with said traction producing means for driving the latter between a first position within said housing and a second position extended from said housing and curved around the peripheral portion of said wheel when said housing is interconnected with said rim, whereby said wheel is provided with additional traction when said traction producing means are in said second position.

4. In a traction device for vehicle wheels, a housing engaged with a wheel of a vehicle for rotation therewith; traction producing means contained within said housing; and elongated manually operable drive means rotatable about the longitudinal axis thereof and coupled with said traction producing means for driving the latter between a first position within said housing and a second position extended from said housing and curved around the peripheral portion of said wheel whereby said wheel is provided with additional traction when said traction producing means are in said second position.

5. In a traction device for vehicle wheels, a housing engaged with a wheel of a vehicle for rotation therewith; a plurality of traction producing, elongated straps, said straps being normally contained within said housing; a plurality of sockets in said housing for receiving a manually manipulable tool; and means coupled with each of said sockets engageable with at least a pair of said straps and with a manually manipulable tool for driving the straps between a first position within said housing and a second position extended from said housing and curved around the peripheral portion of said wheel whereby said wheel is provided with additional traction when said traction producing straps are in said second position.

6. The structure set forth in claim 5, wherein said straps are provided with a rack along an edge thereof and said means coupled with each of said sockets includes a pinion engaged with the racks of at least a pair of said straps.

7. In a traction device for vehicle wheels, a housing engaged with a wheel of a vehicle for rotation therewith; traction producing means contained within said housing; actuatable drive means; and elongated, rotatable force transfer means coupled with said drive means and said traction producing means for driving the latter between a first position within said housing and a second position extended from said housing and curved around the peripheral portion of said wheel when said drive means is actuated and said force transfer means is rotated about the longitudinal axis thereof, whereby said wheel is provided with additional traction when said traction producing means are in said second position.

8. In a traction device for vehicle wheels, a housing engaged with a wheel of a vehicle for rotation therewith; traction producing means contained within said housing; and elongated, electrically operable drive means rotatable about the longitudinal axis thereof and coupled with said traction producing means for driving the latter between a first position within said housing and a second position extended from said housing and curved around the peripheral portion of said wheel whereby said wheel is provided with additional traction when said traction producing means are in said second position.

9. In a traction device for vehicle wheels, a generally cylindrical housing engaged with a wheel of a vehicle for rotation therewith; a plurality of elongated traction producing metal straps contained within said housing, each having a rack along an elongated edge thereof, said straps being movable between a first position within said housing and a second position extended from said housing and curved around the peripheral portion of said wheel; electrically operable drive means positioned centrally of said housing and including a pair of spaced rotatable drive elements positioned centrally of said housing, a pair of fixed drive elements positioned intermediate said rotatable elements and slidable axially in said housing, a plurality of slave gears engaged with said pair of rotatable drive elements to be driven thereby, each of said slave gears being fixed to an end of a rotatable shaft extending radially outwardly from said drive means, a pair of electrically energizable coils, one for coupling each fixed drive element by axially sliding the latter with its adjacent rotatable drive element; a source of electric power; electrically conductive circuit means coupled with said source of power and said pair of coils; selector switch means in said electrically conductive means for selectively energizing one of said coils; and worm gear and pinion assemblies on the opposite ends of said shafts from said slave gears, said assemblies including a pair of pinions engaged with the rack portions of a pair of said straps, energization of one of said coils coupling a fixed and a rotatable drive element whereby rotation of said wheel about said coupled drive elements drives said slave gears, shafts, worm gear and pinion assemblies and said straps.

10. The structure set forth in claim 9, wherein said electrically conductive means includes a coil energization reversal switch responsive to the direction of rotation of said wheel for deenergizing the coil first energized and energizing the second of said pair of coils when the direction of rotation of said wheel is reversed thereby uncoupling the first fixed and rotatable drive elements coupled and coupling the remaining fixed and rotatable drive elements, continuing the strap movement in the direction selected by said selector switch when the direction of wheel rotation is changed.

11. The structure set forth in claim 10, wherein said electrically conductive means further includes limit switch means coupled with said straps for stopping strap movement from said first position to said second position when said straps reach the second position, preventing said straps from being driven out of said housing.

12. In a traction device for vehicle wheels, a generally cylindrical housing engaged with a wheel of a vehicle for rotation therewith; a plurality of elongated traction producing metal straps contained within said housing, each having a rack along an elongated edge thereof, said straps being movable between a first position within said housing and a second position extending from said housing and curved around the peripheral portion of said wheel; electrically operable first drive means positioned centrally of said housing and including a pair of spaced rotatable drive elements positioned centrally of said housing, a pair of fixed drive elements positioned intermediate said rotatable elements and slidable axially in said housing, a plurality of slave gears engaged with said pair of rotatable drive elements to be driven thereby, each of said slave gears being fixed to an end of a rotatable shaft extending radially outwardly from said drive means, a pair of electrically energizable coils, one for coupling each fixed drive element by axially sliding the latter with its adjacent rotatable drive element; a source of electric power; electrically conductive circuit means coupled with said source of power and said pair of coils; selector switch means in said electrically conductive means for selectively energizing one of said coils; worm gear and pinion assemblies on the opposite ends of said shafts from said slave gears, said assemblies including a pair of pinions engaged with the rack portions of a pair of said straps, energization of one of said coils coupling a fixed and a rotatable drive element whereby rotation of said wheel about said coupled drive elements drives said slave gears, shafts, worm gear and pinion assemblies and said straps; and manually operable second drive means including a plurality of sockets in said housing for receiving a manually manipulable tool, and means in each of said sockets engageable with a manually manipulable tool and engaged with said slave gears whereby said straps may be manually driven between said first and second positions.

13. The structure set forth in claim 12, wherein said manually operable drive means further includes means for disengaging said electrically operable first drive means and said straps when said manually operable second drive means are being used.

14. In a traction device for vehicle wheels, a housing; a plurality of clamps contained within said housing and manually extensible therefrom for removably engaging said housing with the rim of a wheel for rotation therewith; traction producing means contained within said housing; and drive means coupled with said traction producing means for driving the latter between a first position within said housing to a second position extended from said housing and curved around the peripheral portion of said wheel, whereby said wheel is provided with additional traction when said traction producing means are in said second position.

15. In a traction device for vehicle wheels, a cylindrical housing engaged with a wheel of a vehicle for rotation therewith; traction producing means contained within said housing and including a plurality of elongated metal straps, each having a rack along an edge thereof; drive means positioned within said housing proximal to the center of the latter; and force transfer means including a plurality of shafts coupled with said drive means and extending radially therefrom, said shafts being coupled with said straps for driving the latter between a first position within said housing and a second position extended from said housing and curved around the peripheral portion of said wheel; and worm gear and pinion assemblies coupled with each shaft and at least a pair of said straps for driving said straps between said first and second positions in response to driving action of said drive means, whereby said wheel is provided with additional traction when said straps are in said second positions.

16. In a traction device for vehicle wheels, a housing engaged with a wheel of a vehicle for rotation therewith; traction producing means contained within said housing; and electrically operable drive means coupled with said traction producing means for driving the latter between a first position within said housing and a second position extended from said housing and curved around the peripheral portion of said wheel, said electrically operable drive means including a fixed drive portion and a rotatable drive portion, the latter drivingly coupled with said traction producing means, a source of electrical power, electrical coupling means coupled with said fixed and rotatable drive portions, electrical circuit means coupled with said source of electrical power and said coupling means, and switch means in said electrical circuit means for selectively breaking and completing said circuit whereby, when said circuit is completed, said coupling means is energized to couple said fixed and rotatable drive portions, said rotatable drive portion being fixed, rotating movement of said wheel driving said traction producing means around said rotatable portion and thereby between said first and second positions.

References Cited in the file of this patent

UNITED STATES PATENTS

| | | |
|---|---|---|
| 2,754,874 | Gardner | July 17, 1956 |
| 2,900,002 | Ecker | Aug. 18, 1959 |